UNITED STATES PATENT OFFICE.

RALPH H. McKEE, OF ORONO, MAINE.

METHOD OF OBTAINING ALUMINUM SALTS FROM SILICATES.

1,222,960.  Specification of Letters Patent.  Patented Apr. 17, 1917.

No Drawing.  Application filed March 13, 1916.  Serial No. 83,971.

*To all whom it may concern:*

Be it known that I, RALPH H. McKEE, a citizen of the United States, residing at Orono, in the county of Penobscot and State of Maine, have invented certain new and useful Improvements in Methods of Obtaining Aluminum Salts from Silicates, of which the following is a specification.

It is known that water-soluble potassium salts may be prepared from sericite (potash-bearing mica-schist) and silicates of analogous composition, by heating the same with lime or limestone and salt; or with lime or limestone and salt used in conjunction with a reducing agent, such as a fuel material. (See my prior U. S. Patent No. 869,011, patented October 22, 1907).

Such silicates as are above referred to contain considerable quantities of alumina, which remains with the water-insoluble residue. I have now discovered that this residual alumina is easily extracted by an appropriate acid-treatment, and is therefore readily recoverable as an aluminum salt, usually a sulfate or chlorid.

In carrying out my process, I prefer to furnace the potash and alumina-bearing silicate, as the herein-before mentioned mica-schist, with limestone or lime and salt, under conditions which may be as recited in my prior patent above referred to. That is, five parts by weight, more or less, of the finely powdered schist may be intimately mixed with approximately one part by weight each of limestone and common salt, and the mixture furnaced in a rotary kiln. Suitable furnacing conditions are as disclosed in my said prior patent, although the present invention is not limited either to the proportions of the charge or to the conditions of furnacing as therein described. The liberation of the potassium salt is facilitated by providing reducing conditions throughout the furnacing operation, as for example by the addition of fuel such as coal, oil or gas.

The furnaced product is leached with water and the potassium salt recovered in commercial form by evaporation.

The residue from the water-extraction is now decomposed by an acid reagent, usually sulfuric or hydrochloric acid, whereby the alumina is dissolved as sulfate or chlorid. Sulfuric acid is preferably used, since thereby calcium sulfate and silica remain undissolved and aluminum sulfate is directly recoverable by evaporation of the solutions as a commercially pure product. Hot strong sulfuric acid (80% or above) effects this decomposition in a few minutes. At lower temperatures, or with dilute (15%) acid the same result is accomplished more slowly and not quite so completely. In so far as the decomposition of the residual silicate is concerned, hydrochloric acid gives similar results.

The expression "silicates of the sericite type" as used in the claims is intended to include such silicates containing potassium and aluminum as are susceptible to treatment by this process.

As a modification of the method above described, the furnaced product may be treated directly with dilute acid, preferably sulfuric acid, whereby the decomposition of the residual silicate proceeds simultaneously with the extraction of the potash salts, and the potassium and aluminum are recovered, at least in part, in the form of potash alum, which is readily purified by crystallization.

I claim:—

1. The herein described method of obtaining commercially pure aluminum salts from silicates of the sericite type, which consists in furnacing said silicates with lime or limestone and a chlorid, producing thereby a water-soluble potassium salt, extracting the soluble potassium salt, and decomposing the residual silicate by an acid reagent.

2. The herein described method of obtaining commercially pure aluminum salts from silicates of the sericite type, which consists in furnacing said silicates with lime or limestone, a chlorid and a reducing agent, producing thereby a water-soluble potassium salt, extracting the soluble potassium salt, and decomposing the residual silicate by an acid reagent.

In testimony whereof I affix my signature in presence of two witnesses.

RALPH H. McKEE.

Witnesses:
PATRICK H. HOULIHAN,
F. L. MORRIS.